United States Patent
Battaglia et al.

(10) Patent No.: US 12,544,334 B2
(45) Date of Patent: Feb. 10, 2026

(54) METABOLISABLE pH SENSITIVE POLYMERSOMES

(71) Applicant: UCL BUSINESS LTD, London (GB)

(72) Inventors: Giuseppe Battaglia, London (GB); Alessandro Poma, London (GB); Denis Cecchin, London (GB)

(73) Assignee: UCL BUSINESS LTD, London (GB)

( * ) Notice: Subject to any disclaimer, the term of this patent is extended or adjusted under 35 U.S.C. 154(b) by 1390 days.

(21) Appl. No.: 17/046,953

(22) PCT Filed: Apr. 11, 2019

(86) PCT No.: PCT/GB2019/051049
§ 371 (c)(1),
(2) Date: Oct. 12, 2020

(87) PCT Pub. No.: WO2019/197834
PCT Pub. Date: Oct. 17, 2019

(65) Prior Publication Data
US 2021/0154142 A1  May 27, 2021

(30) Foreign Application Priority Data
Apr. 13, 2018 (GB) .................... 1806095

(51) Int. Cl.
*A61K 9/1273* (2025.01)
*B82Y 5/00* (2011.01)
*B82Y 40/00* (2011.01)

(52) U.S. Cl.
CPC .............. *A61K 9/1273* (2013.01); *B82Y 5/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 6,384,105 B1 | 5/2002 | He et al. | |
| 7,229,973 B2 | 6/2007 | Bae et al. | |
| 9,732,142 B2 | 8/2017 | Lewis | |
| 10,357,454 B2 | 7/2019 | Kataoka et al. | |
| 2003/0223938 A1 | 12/2003 | Nagy et al. | |
| 2005/0163743 A1 | 7/2005 | Lewis et al. | |
| 2006/0105982 A1 | 5/2006 | Pardridge | |
| 2008/0181939 A1 | 7/2008 | Discher et al. | |
| 2008/0311045 A1 | 12/2008 | Hardy | |
| 2009/0060955 A1 | 3/2009 | Bae et al. | |
| 2009/0286247 A1 | 11/2009 | Hirao et al. | |
| 2010/0003336 A1 | 1/2010 | Deming et al. | |
| 2010/0226955 A1 | 9/2010 | Ludwig et al. | |
| 2010/0310660 A1 | 12/2010 | Tsai et al. | |
| 2010/0316706 A1 | 12/2010 | Joshi et al. | |
| 2011/0027347 A1 | 2/2011 | Bae et al. | |
| 2011/0065807 A1 | 3/2011 | Radovic-Moreno et al. | |
| 2011/0111036 A1 | 5/2011 | Lewis et al. | |
| 2011/0150941 A1 | 6/2011 | Battaglia | |
| 2011/0172240 A1 | 7/2011 | Milne et al. | |
| 2012/0076730 A1 | 3/2012 | Muro Galindo et al. | |
| 2012/0135070 A1 | 5/2012 | Kros et al. | |
| 2015/0079180 A1 | 3/2015 | Karaborni et al. | |
| 2015/0110713 A1 | 4/2015 | Manganaro et al. | |
| 2016/0106673 A1 | 4/2016 | Lewis | |
| 2017/0002004 A1* | 1/2017 | Zankel ............... A61K 31/4465 |
| 2017/0020816 A1 | 1/2017 | Nagy et al. | |
| 2017/0202752 A1 | 7/2017 | Xu et al. | |
| 2019/0046445 A1 | 2/2019 | Battaglia | |
| 2019/0076359 A1 | 3/2019 | Battaglia | |

FOREIGN PATENT DOCUMENTS

| | | |
|---|---|---|
| EP | 2 322 227 A1 | 5/2011 |
| JP | H03-31718 B2 | 5/1991 |
| JP | 2011-520841 A | 7/2011 |
| KR | 10-2017-0085784 A | 7/2017 |
| WO | 93/01221 A1 | 1/1993 |
| WO | 94/16749 A1 | 8/1994 |
| WO | 95/20407 A1 | 8/1995 |
| WO | 00/61114 A1 | 10/2000 |
| WO | 02/028929 A1 | 4/2002 |
| WO | 03/074090 A2 | 9/2003 |
| WO | 2006/080849 A2 | 8/2006 |
| WO | 2009/061473 A2 | 5/2009 |
| WO | 2009/138472 A1 | 11/2009 |
| WO | 2009/138473 A2 | 11/2009 |
| WO | 2009/138477 A2 | 11/2009 |
| WO | 2010/124829 A1 | 11/2010 |

(Continued)

OTHER PUBLICATIONS

Liu et al. pH-sensitive nano-systems for drug delivery in cancer therapy, Biotechnology Advances 32 (2014) 693-710 (Year: 2014).*
Lu, Fei et al., "Angiopep-2-conjugated poly(ethylene glycol)-co-poly(ε-caprolactone) polymersomes for dual-targeting drug delivery to glioma in rats," Int J Nanomed, 2017; 12: 2117-2127.
Martín, Vanesa et al., "Signaling pathways involved in antioxidant control of glioma cell proliferation," Free Rad Bio Med, vol. 42, Issue 11, Jun. 1, 2007, pp. 1715-1722.
Battaglia G, Angioletti-Uberti S. Design principles for precision targeting. ChemRxiv. Cambridge: Cambridge Open Engage; Dec. 1, 2017; online preprint, DOI: 10.26434/chemrxiv.5647969.v1; 14 pages.

(Continued)

*Primary Examiner* — David J Blanchard
*Assistant Examiner* — Sarah J Chickos
(74) *Attorney, Agent, or Firm* — Kilpatrick Townsend & Stockton LLP (57) ABSTRACT

The present application relates to pH-sensitive polymersomes. The polymersomes are capable of degradation at endosomes' mild acidic pH into resorbable materials, which also allows avoiding liposome premature degradation of the payload once internalised inside the cells. The polymersomes can thus be used in methods for the treatment or prevention of diseases.

10 Claims, 3 Drawing Sheets

(56) References Cited

FOREIGN PATENT DOCUMENTS

| WO | 2010/148653 | A1 | 12/2010 | |
|---|---|---|---|---|
| WO | 2011/005098 | A1 | 1/2011 | |
| WO | 2011/116132 | A1 | 9/2011 | |
| WO | WO-2011147926 | A2 * | 12/2011 | ......... A61K 41/0028 |
| WO | 2012/046994 | A2 | 4/2012 | |
| WO | 2013/078562 | A2 | 6/2013 | |
| WO | 2014/122646 | A1 | 8/2014 | |
| WO | 2015/059180 | A2 | 4/2015 | |
| WO | 2016/090111 | A1 | 6/2016 | |
| WO | 2017/144849 | A1 | 8/2017 | |
| WO | 2017/158382 | A1 | 9/2017 | |
| WO | 2017/191444 | A1 | 11/2017 | |
| WO | 2017/199023 | A1 | 11/2017 | |
| WO | 2017/218825 | A1 | 12/2017 | |
| WO | 2018/200951 | A1 | 11/2018 | |

OTHER PUBLICATIONS

Battaglia G, Angioletti-Uberti S. Design principles for precision targeting. ChemRxiv. Cambridge: Cambridge Open Engage; Feb. 19, 2018; online preprint, DOI: 10.26434/chemrxiv.5647969.v2; 14 pages.

Abbas et al. "p21 in Cancer: Intricate Networks and Multiple Activities," (2009) Nat Rev. Cancer 9, 400-414.

Abdelmoshen et al. "Formation of Well-Defined, Functional Nanotubes via Osmotically induced Shape Transformation of Biodegradable Polymersomes," (2016) J. Am. Chem. Soc. 138, 9353-9356.

Anderson "Movement of a semipermeable vesicle through an osmotic gradient," (1983) Phys. Fluids 26, 2871-2879.

Arnold et al. "Enrichment of Single-Walled Carbon Nanotubes by Diameter in Density Gradients," (2005) Nano Letters 5, 713-718.

Arnold et al. "Sorting carbon nanotubes by electronic structure using density differentiation," (2006) Nature Nano 1, 60-65.

Bae et al. "Safety and Efficacy Evaluation of Carnosine, An Endogenous Neuroprotective Agent for Ischemic Stroke," (2013), Stroke, 44, 205-212.

Battaglia and Ryan "Bilayers and Interdigitation in Block Copolymer Vesicles," (2005) J. Am. Chem. Soc. 127(24), 8757-8764.

Battaglia and Ryan "Effect of Amphiphile Size on the Transformation from a Lyotropic Gel to a Vesicular Dispersion," (2006) Macromolecules 39, 798-805.

Battaglia and Ryan "Neuron-Like Tubular Membranes Made of Diblock Copolymer Amphiphiles," (2006) Angewandte Chemie International Edition 45(13), 2052-2056.

Battaglia and Ryan "Pathways of Polymeric Vesicle Formation," (2006) The Journal of Physical Chemistry B, 110, 102727-10279.

Battaglia and Ryan "The evolution of vesicles from bulk lamellar gels," (2005) Nat. Mater. 4, 869-876.

Battaglia et al. "Polymeric Vesicle Permeability: A Facile Chemical Assay," (2006), Lanmuir 22, 4910.

Battaglia et al. "Wet Nanoscale Imaging and Testing of Polymersomes," (2011) Small 7(14), 2010-2015.

Bieging et al. "Unravelling mechanisms of p53-mediated tumour suppression," (2014) Nat. Rev. Cancer 14, 359-370.

Blanazs et al. "Mechanistic Insights for Block Copolymer Morphologies: How Do Worms Form Vesicles?," (2011) J. Am. Chem. Soc. 133(41), 16581-16587.

Blanazs et al. "Tailoring Macromolecular Expression at Polymersome Surfaces," (2009) Adv. Funct. Mater. 19(18), 2906-2914.

Canton et al. "Fully synthetic polymer vesicles for intracellular delivery of antibodies in live cells," (2013) FASEB J. 27(1), 98-108.

Canton et al. "Scavenger receptors in homeostasis and immunity," (2013) Nature Rev. Imm. 13, 621-634.

Cecchin et al. "Enzyme-driven chemotactic synthetic vesicles" (abstract and slides) presented at 248th ACS National Meeting: Stimuli-responsive supramolecular, macromolecular and nanostructured systems and biopolymer-driven organization of nanostructures (2014).

Chambon et al. "Facile Synthesis of Methacrylic ABC Triblock Copolymer Vesicles by RAFT Aqueous Dispersion Polymerization," (2012) Macromolecules 45, 5081-5090.

Chambon et al. "How Does Cross-Linking Affect the Stability of Block Copolymer Vesicles in the Presence of Surfactant?," (2012) Langmuir 28, 1196-120.

Chen et al. "High-Purity Separation of Gold Nanoparticle Dimers and Trimers," (2009) Journal of the American Chemical Society 131, 4218-4219.

Chen et al. "In vivo targeting of B-cell lymphoma with glycan ligands of CD22," (2010) Blood 115(23), 4778-4786.

Chen et al. "Polymersomes conjugated with des-octanoyl ghrelin and folate as a BBB-penetrating cancer cell-targeting delivery system," (2014) Biomaterials 35, 4066-4081.

Cheng and Deming, (2011) "Synthesis of Polypeptides by Ring-Opening Polymerization of α-Amino Acid N-Carboxyanhydrides" (. In: Deming T. (eds) Peptide-Based Materials. Topics in Current Chemistry, 310:1-26. Springer, Berlin.

Christian et al. "Spotted vesicles, striped micelles and Janus assemblies induced by ligand binding" (2009) Nature Mater 8, 843-849.

Colley et al. "Polymersome-Mediated Delivery of Combination Anticancer Therapy to Head and Neck Cancer Cells: 2D and 3D in Vitro Evaluation," (2014) Molecular Pharmaceuticals 11, 1176-1188.

Curk et al., "Optimal multivalent targeting of membranes with many distinct receptors," (2014) PNAS 114(28), 7210-7215.

Discher et al. "Polymersomes: Tough Vesicles Made from Diblock Copolymers," (1999) Science 284, 1143-1146.

Du et al. "pH-Sensitive Vesicles Based on a Biocompatible Zwitterionic Diblock Copolymer," (2005) J. Am. Chem. Soc 127(51), 17982-17983.

Ebbens et al. "Size dependence of the propulsion velocity for catalytic Janus-sphere swimmers," (2012) Phys. Rev. E 85 020401(R).

Gaitzsch et al. "Synthetic Bio-nanoreactor: Mechanical and Chemical Control of Polymersome Membrane Permeability," (2012) Angew. Chem. Int. Ed. 51, 4448-4451.

Georgieva et al. "Peptide-Mediated Blood-Brain Barrier Transport of Polymersomes," (2012) Angew. Chem. Int. Ed. 51, 8339-8342.

Gerold et al. "Locking out hepatitis C," (2011) Nature Medicine 17, 542-544.

Ghoreschi et al. "Fumarates improve psoriasis and multiple sclerosis by inducing type II dendritic cells," (2011) J Exp Med 208, 2291-2303.

Giacomelli et al. "Phosphorylcholine-Based pH-Responsive Diblock Copolymer Micelles as Drug Delivery Vehicles: Light Scattering, Electron Microscopy, and Fluorescence Experiments," (2006) Biomacromolecules 7, 817-828.

Gordon "Osmophoresis," (1981) J Phys. Chem. 85, 1753-1755.

Grumelard et al. "Soft nanotubes from amphiphilic ABA triblock macromonomers," (2004) Chemical Communications 13, 1462-1463.

International Search Report and Written Opinion issued by the EPO in respect of corresponding international application publication WO 2019/197834, dated Jul. 2, 2019, 14 pages.

Joseph et al. "Chemotactic synthetic vesicles: Design and applications in blood-brain barrier crossing," (2017) Sci Adv 3, e1700362, 1-12.

Kim et al. "A Polymersome Nanoreactor with Controllable Permeability Induced by Stimuli-Responsive Block Copolymers," (2009) Adv Mat 21, 2787-2791.

Lagzi "Chemical robotics—chemotactic drug carriers," (2013) Central Eur J Medicine 8(4), 377-382.

Lee and Feihen "Polymersomes for drug delivery: Design, formation and characterization," (2012) J Control Release 161(2), 473-483.

Linker et al. "Fumaric acid esters exert neuroprotective effects in neuroinflammation via activation of the Nrf2 antioxidant pathway," (2011) Brain 134, 678-692.

Liu et al. "A game of entropy: range selective binding in multivalent constructs," (2018) online preprint, DOI: 10.26434/chemrxiv.5647969. v2; 21 pages.

Liu et al. "Hydrolysable core crosslinked particles for receptor-mediated pH-sensitive anticancer drug delivery" (2015) New Journal of Chemistry 39(11), 8840-8847.

(56) References Cited

OTHER PUBLICATIONS

Loewe et al. "Nuclear Entry of NF-kB/p65 in Human Dimethylfumarate Inhibits TNF-Induced Endothelial Cells," (2002) J. Immunol. 168, 4781-4787.
Lomas et al. "Biomimetic pH Sensitive Polymersomes for Efficient DNA Encapsulation and Delivery," (2007) Adv. Mater. 19, 4238-4242.
Lomas et al. "Efficient Encapsulation of Plasmid DNA in pHSensitive PMPC-PDPA Polymersomes: Study of the Effect of PDPA Block Length on Copolymer—DNA Binding Affinity," (2010) Macromolecular Bioscience 10, 513-530.
Lomas et al. "Non-cytotoxic polymer vesicles for rapid and efficient intracellular delivery," (2008) Faraday discussions 193, 143-159.
Lopresti et al. "Controlling Polymersome Surface Topology at the Nanoscale by Membrane Confined Polymer/Polymer Phase Separation," (2011) ACS NANO 5(3), 1775-1784.
Lopresti et al. "Polymersomes: nature inspired nanometer sized compartments," (2009) J. Mater. Chem. 19, 3576-3590.
Martín et al. "Template Electrosynthesis of High-Performance Graphene Microengines," (2015) Small 11(29), 3568-3574.
Massignani et al "Controlling Cellular Uptake by Surface Chemistry, Size, and Surface Topology at the Nanoscale," (2009) Small 5(21), 2424-2432.
Massignani et al "Enhanced Fluorescence Imaging of Live Cells by Effective Cytosolic Delivery of Probes," (2010) Plos One, 5(5): e10459.
Meng et al. "Stimuli-Responsive Polymersomes for Programmed Drug Delivery," (2009) Biomacromolecules 10(2), 197-209.
Murdoch et al. "Internalization and biodistribution of polymersomes into oral squamous cell carcinoma cells in vitro and in vivo," (2010) Nanomedicine 5, 1025-1036.
Najafi et al. "Biodegradable micelles/polymersomes from fumaric/sebacic acids and poly(ethylene glycol)," (2003) Biomaterials 24(7), 1175-1182.
Napoli et al., "Glucose-oxidase Based Self-Destructing Polymeric Vesicles," (2004) Langmuir 20(9), 3487-3491.
Neculai et al. "Structure of LIMP-2 provides functional insights with implications for SR-BI and CD36," (2013) Nature 504, 172-176.
Oltra et al. "From Stealthy Polymersomes and Filomicelles to Self Peptide-Nanoparticles for Cancer Therapy," (2014) Annu Rev Chem Biomol Eng 5, 281-299.
Paul et al. "Ring-opening copolymerization (ROCOP): synthesis and properties of polyesters and polycarbonates," (2015) Chem. Commun. 51, 6459-6479.
Pearson et al. "Effect of pH and Temperature on PMPC-PDPA Copolymer Self-Assembly," (2013) Macromolecules 46, 1400-1407.
Peng et al. "Self-Guided Supramolecular Cargo-Loaded Nanomotors with Chemotactic Behavior towards Cells," (2015) Angew Chem Int Ed 54, 11662-11665.
Pulicherla et al. "Targeting Therapeutics Across the Blood Brain Barrier (BBB), Prerequisite Towards Thrombolytic Therapy for Cerebrovascular Disorders—an Overview and Advancements," (2015) AAPS PharmSciTech 16(2), 223-233.
Reiner et al. "Optical manipulation of lipid and polymer nanotubes with optical tweezers," (2004) SPIE 5514, 246-253.
Reiner et al. "Stable and robust polymer nanotubes stretched from polymersomes," (2006) PNAS 103(5), 1173-1177.
Robertson et al. "pH-Sensitive Tubular Polymersomes: Formation and Applications in Cellular Delivery," (2014) ACS Nano 8(5), 4650-4661.
Robertson et al. "Purification of Nanoparticles by Size and Shape," (2016) Scientific Reports 6:27494.
Rosselgong et al. "Thiol-Functionalized Block Copolymer Vesicles," (2012) ACS Macro Letters 1, 1041-1045.
Ruiz-Perez et al. "Molecular engineering of polymersome surface topology," (2015) Sci Adv 2(4), e1500948).
Saha et al. "Clusters, asters, and collective oscillations in chemotactic colloids," (2014) Phys. Rev. E 89, 062316.
Sahari et al. "Directed transport of bacteria-based drug delivery vehicles: bacterial chemotaxis dominates particle shape," (2014) Biomedical Microdevices 16(5), 717-725.
Sanchez-Lopez et al. "Evaluation of liposome populations using a sucrose density gradient centrifugation approach coupled to a continuous flow system," (2009) Analytica Chimica Acta 645, 79-85.
Scannevin et al. "Fumarates Promote Cytoprotection of Central Nervous System Cells against Oxidative Stress via the Nuclear Factor (Erythroid-Derived 2)-Like 2 Pathway," (2012) J, Pharmacol. Exp. Ther. 341, 274-284.
Sharma et al. "Nanocarriers as Promising Drug Vehicles for the Management of Tuberculosis," (2013) Bionanoscience 3(2), 102-111.
Steineweg et al. "Fast and Cost-Effective Purifi cation of Gold Nanoparticles in the 20-250 nm Size Range by Continuous Density Gradient Centrifugation," (2011) Small 7(17), 2443-2448.
Sui et al. "Robust formation of biodegradable polymersomes by direct hydration," (2015) Polymer Chemistry 6(5), 691-696.
Sun et al. "Separation of Nanoparticles in a Density Gradient: FeCo@C and Gold Nanocrystals," (2008) Angewandte Chemie International Edition 48(5), 939-942.
Themistou et al. "Facile synthesis of thiol-functionalized amphiphilic polylactide-methacrylic diblock copolymers," (2014) Polymer Chem 5, 1405-1417.
Tian et al. "LRP-i.-mediated intracellular antibody delivery to the Central Nervous System," (2015) Scientific Reports 5:11990.
United Kingdom Search Report issued by the UKIPO in respect of the corresponding priority application, GB1806095.4, dated Sep. 27, 2018, 4 pages.
Van Oers et al. "Tubular Polymersomes: A Cross-Linker-Induced Shape Transformation," (2013) J. Am. Chem. Soc. 135(44), 16308-16311.
Vlieghe and Khrestchatisky "Peptide-based vectors for blood-brain barrier targeting and delivery of drugs to the central nervous system," (2010) Therapeutic Delivery 1(4), 489-494.
Wang et al. "Encapsulation of Biomacromolecules within Polymersomes by Electroporation," (2012) Angew. Chem., Int. Ed. 51, 11122-11125.
Xu et al. "Polymeric Micelles, a Promising Drug Delivery System to Enhance Bioavailability of Poorly Water-Soluble Drugs," (2013) J Drug Delivery ID 340315, 1-15.
Xu et al. "Thermosensitive Polypeptide Hydrogels as a Platform for ROS-Triggered Cargo Release with Innate Cytoprotective Ability under Oxidative Stress," (2015) Adv Healthcare Mat 5, 1979-1990.
Yakovlev and Deming "Controlled Synthesis of Phosphorylcholine Derivatives of Poly(serine) and Poly(homoserine)," (2015) J. Am. Chem. Soc. 137(12), 4078-4081.
Yealland et al. "Rescue of mitochondrial function in parkin-mutant fibroblasts using drug loaded PMPC-PDPA polymersomes and tubular polymersomes," (2016) Neuroscience Letters 630, 23-29.
Yu et al. "Targeting Strategies for Multifunctional Nanoparticles in Cancer Imaging and Therapy," (2012) Theranostics 2(1), 3-44.
Chen et al., "Polymersomes conjugated with des-octanoyl ghrelin for the delivery of therapeutic and imaging agents into brain tissues", Biomaterials, vol. 35, Issue 6, pp. 2051-2065, Feb. 2014.
Hucknall et al., "In pursuit of zero: polymer brushes that resist the adsorption of proteins," Advanced Materials. Jun. 19, 2009;21(23):2441-6.
Kluza et al., "Dual-targeting of avl33 and galectin-1 improves the specificity of paramagnetic/fluorescent liposomes to tumor endothelium in vivo," Journal of Controlled Release. Mar. 10, 2012;158(2):207-14.
Liu et al., "Synergetic combinations of dual-targeting ligands for enhanced in vitro and in vivo tumor targeting," Advanced Healthcare Materials. Aug. 2018;7(15):1800106.
Mcclellan, Annie Katherine, "Raft Polymerization Of Ph-Responsive, Diblock Copolymers For Nucleic Acid Delivery Vehicles," (May 2016). The University of Mississippi: Electronic Theses and Dissertations, 398.
Nie et al., "Dual-targeted polyplexes: one step towards a synthetic virus for cancer gene therapy," Journal of Controlled Release. May 30, 2011; 152(1):127-34.

(56) References Cited

OTHER PUBLICATIONS

Pardridge, WM, "Drug targeting to the brain," Pharmaceutical Research. Sep. 2007; 24:1733-44.
Saul et al., "A dual-ligand approach for enhancing targeting selectivity of therapeutic nanocarriers," Journal of Controlled Release. Sep. 12, 2006; 114(3):277-87.

* cited by examiner

Fig. 1

• Polymersomes size < 100nm in average

METABOLISABLE pH SENSITIVE POLYMERSOMES

CROSS-REFERENCE TO RELATED APPLICATIONS

This application is a U.S. National Phase under 35 USC § 371 of PCT Application No. PCT/GB2019/051049 filed Apr. 11, 2019, which claims priority to GB Application No. GB1806095.4, filed Apr. 13, 2018, the disclosures of which are incorporated by reference herein.

FIELD OF THE INVENTION

The present invention relates to metabolisable pH sensitive polymersomes. The polymersomes are made of metabolisable materials that are categorised by FDA and MHRA as generically recognized as safe (GRAS). Use has been made of a derivative with an imidazole ring as hydrophobic part of an amphiphilic block co-polymer. One exemplary class of polymer, polypropylene ((((1H-imidazol-5-yl)acetamido)-3-oxopropyl)thio)succinate (PPITS) and derivatives thereof, is pH sensitive, hydrophobic at neutral pH and hydrophilic at mildly acidic pH, whose hydrolysis products will be metabolised by the liver or resorbed as components of the Krebs cycle. The polymersomes can thus be used in methods to treat or decrease the symptoms of diabetes, cancer, infectious, and autoimmune diseases.

BACKGROUND OF THE INVENTION

The need to deliver a pharmacological dose of a drug to a targeted site with high efficacy, using a route that will facilitate patient compliance, is of critical importance for effective and safe disease management.

Polymeric nanocarriers are being used to address the key issues in drug delivery: loading a sufficient dosage of the active cargo, protecting it from the surrounding environment in vivo, and steadily releasing it at the targeted site without eliciting systemic toxicity.

The intracellular delivery of drugs has been attracting increasing research interest, mainly because of their important effects and functions in several diseases. Subcellular targeting is vital for efficient, specific treatments and, thus, specific barriers must be overcome. The importance of organelle targeting increases when drugs efficiently treat or decreases symptoms of diseases such as cancer, Alzheimer's, diabetes, infectious and autoimmune diseases. Specifically, the intracellular environment contains compounds, responsible for cell growth, proliferation, differentiation, and death, that are, therefore, promising drug targets. Thus, target sites can be distributed throughout the cytoplasm, nucleus, mitochondria, endoplasmic reticulum (ER), and Golgi complex. However, endosomes and lysosomes, which have a low pH and are rich in enzymes, can result in drug degradation or nonspecific distribution. Thus, modulation of the size, charge, and surface composition of a nanomaterial can dictate the internalization pathway, enabling the nanomaterial to evade lysosomes and interact with its target organelle. Indeed, the potential of nanomaterials to overcome such barriers has led to the development of polymers such as poly[propylene (1H-imidazol-5-yl)acetamido)-3-oxopropyl)thio)succinate (PPITS), and derivatives thereof, capable of improving drugs' bioavailability and intracellular delivery by using their pH sensitivity.

Nanovesicles formed using PPITS, and derivatives thereof, are important because they enable drugs to cross physiological barriers to reach their target sites safely and sustainably. In fact, they provide a stable biocompatible environment to encapsulate drugs, promoting their intracellular release and efficient absorption. They also improve the duration of the therapeutic effects and minimize adverse effects by driving drugs toward the site of action and increasing the concentration of a drug in the area of pathology in a specific way.

pH sensitive smart polymers contain weakly acidic or basic functional groups that will either accept or lose protons depending on the local pH. This stimulates the degradation of the polymer at an endosomal level, providing intracellular release and avoiding lysosome degradation of the payload.

The development of such polymers often employs 'click' chemistry, including alkyne-azide cycloaddition, Diels-Alder reaction, thiol-ene addition, and other coupling strategies such as Michael addition, increasing the diversity of macromolecular architectures that can be accessed. Alkyne-azide cycloaddition is one of the most extensively explored click reactions for the modification of pre-formed macromolecules as well as their synthesis. Diels-Alder cycloaddition has been used to construct a range of macromolecules, and its thermosensitive reversibility has provided a platform to develop degradable nanocarriers for drug delivery.

The imidazole group on the polymer exhibits a pKa within the desired range of pH for escaping lysosomal degradation. The pKa value, though, can also be further tailored by modifying the position as well as nature of the different substituents around the imidazole ring. This pH-sensitivity has been introduced by exploiting the double bond present in poly(propyl fumarate) (PPF) either as it comes or after isomerisation of poly(propyl maleate) (PPM), as well as on pristine PPM by conjugating tert-butyl cysteinate via thiol-ene addition. This is just one example of the possible conjugation chemistries (e.g. Diels-Alder, aldol reaction) involving the double bond within the polymer structure. The cysteine N-terminus can be conjugated to imidazole or methylimidazole bearing acids including the 1H-imidazole-1-acetic acid (pKa 6.8), 4-imidazolacetic acid, (pKa 6.6), Di-Methylimidazoleacetic acid (pKa 6.4) and Methylimidazoleacetic acid (pKa 6.2). This conjugation reaction can be performed before or after the thiol-ene addition, via NHS chemistry or other type of conjugation reactions which are well known amongst those skilled in the art. Similarly, the same cysteine derivative protected on the amino group (with a tert-butoxy carbonyl moiety) and with the free carboxylic group can also be conjugated to the same imidazole moieties but deriving from a histamine derivative. In all cases, all these structures are metabolites part of histidine metabolism and/or histamine catabolism and they will allow tuning the final polymer pKa from 6.2 to 6.8. Furthermore, the number of functionalities can be tuned by adding to the polymerisation mixture a saturated monomer, such as succinic acid (in case of polycondensation) or succinic anhydride (in case of ring-opening copolymerisation, or ROCOP), thus creating sequences of saturated and unsaturated polyesters.

Tuning the chemical properties enables the creation of functionalized polymersomes with enhanced intracellular delivery, with the ability to escape premature lysosome degradation, and to reach a specific intracellular target.

SUMMARY OF THE INVENTION

The present invention provides a polymersome that comprises: (a) a protein repellent polymer; and (b) a pH sensitive biodegradable succinate polymer comprising a pendant group with a pKa of from 4 to 7.

Polymersomes (vesicles formed from amphiphilic block copolymers) are the polymeric equivalent of liposomes. They are known to be much more robust and stable than their lipid counterparts due to their macromolecular nature. In addition, their macromolecular nature also allows a very effective tuning of the membrane thickness. Polymersomes that are sensitive to pH have previously been developed and shown to be capable of delivering certain types of molecules to the cell cytosol.

It has now been found that polymersomes comprising the components (a) and (b) provide a co-polymer able to self-assemble at physiological pH into a robust polymersome, which is then able to disassemble at mild acidic intracellular pH (endosomes) into resorbable materials.

It has been found that the components (a) and (b) within the polymersomes function synergistically. The component (a) is protein repellent and can selectively target receptors expressed by the disease cells. The component (b) is a biodegradable polymer that releases molecules such as, for example, fumarate, thiosuccinate derivatives with or without tert-butyl group and imidazole by in situ hydrolysis and/or enzymatic degradation (e.g., by lipases or esterases). The capacity of the polymersomes of the invention to incorporate tuned intrinsic pH sensitivity significantly enhances intracellular drug delivery whilst also avoiding lysosomal degradation of the payload.

The present invention additionally provides a pharmaceutical composition comprising: a plurality of the polymersomes of the present invention; and one or more pharmaceutically acceptable excipients or diluents.

DETAILED DESCRIPTION OF THE INVENTION

Polymersome

Figure 1:
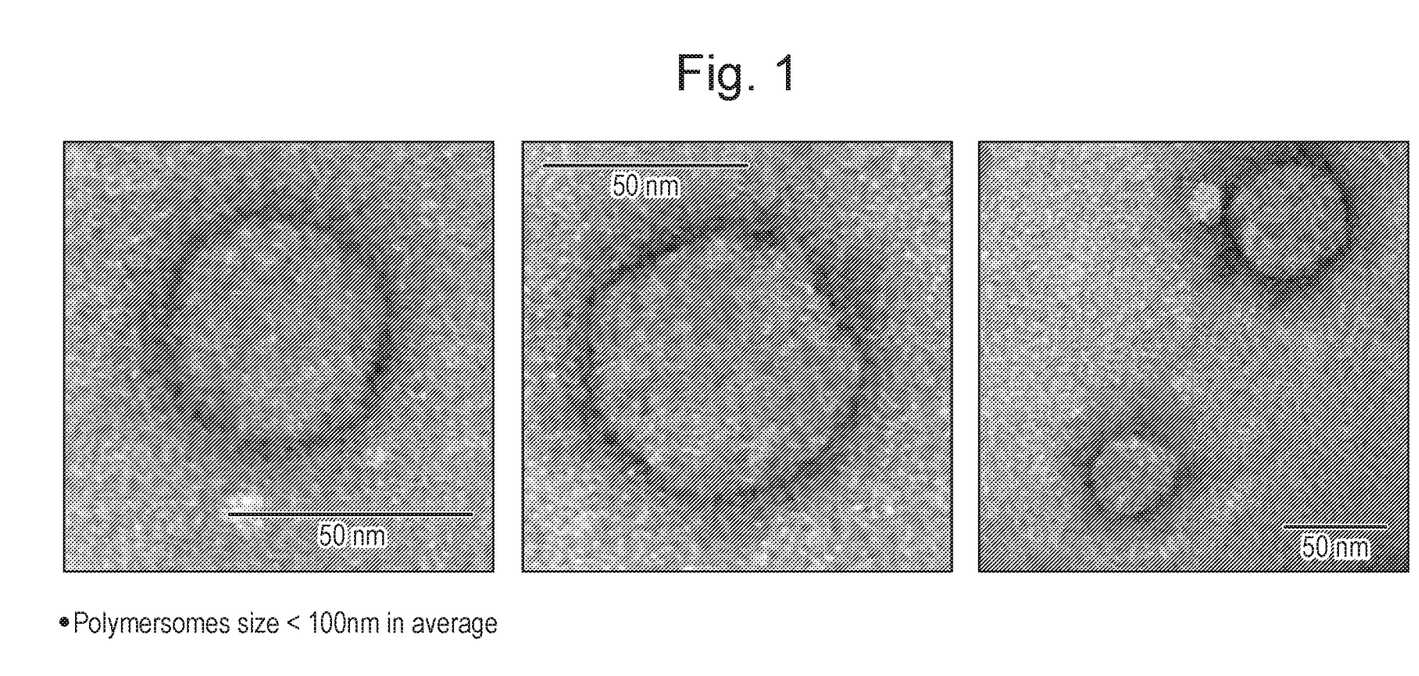
FIG. 1 shows Transmission Electron microscopy images of PMPC-PPITS polymersomes (scale bar 50 nm), as further described in the Examples section.
Figure 2:
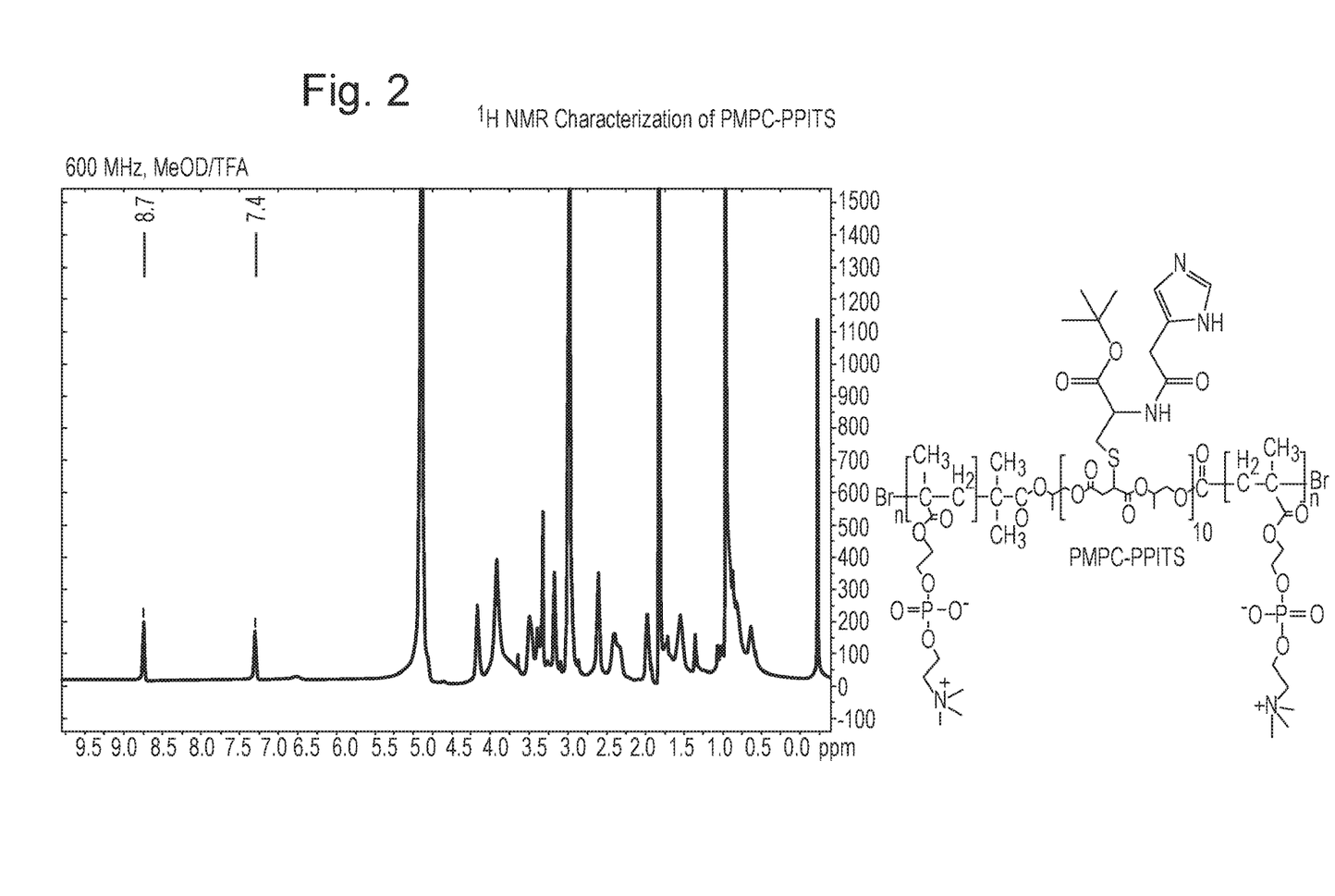
FIG. 2 shows NMR characterisation of PMPC-PPITS (peaks at 8.7 and 7.4 correspond to the imidazole ring protons), as further described in the Examples section.
Figure 3:
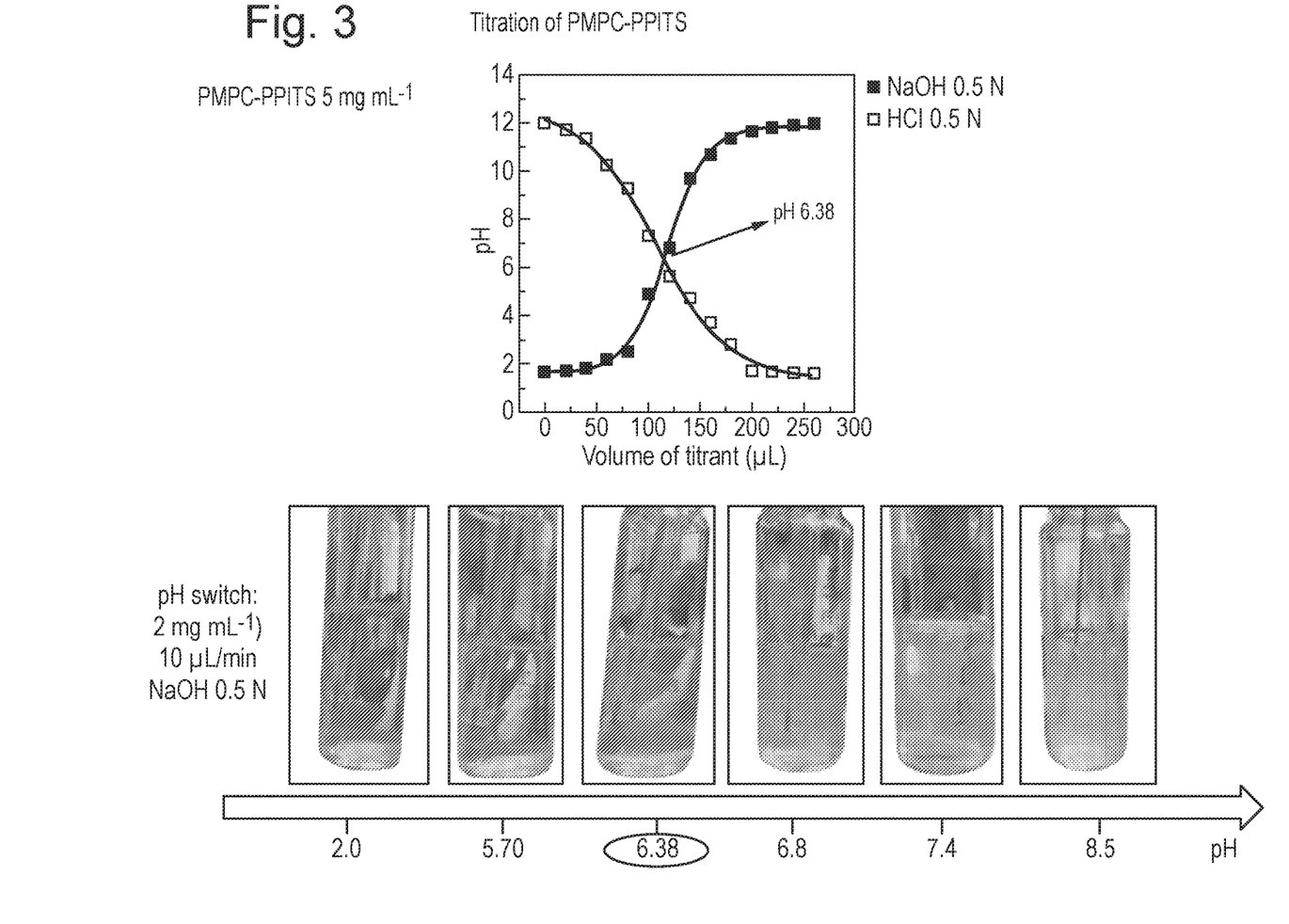
FIG. 3 shows pH titration of PMPC-PPITS, as further described in the Examples section. The polymer is solubilised at acidic pH, with HCl 0.5 N. The solution is slowly added with 0.5N NaOH to pH 12.

The polymersome of the present invention comprises: (a) a protein repellent polymer; and (b) a pH sensitive biodegradable succinate polymer comprising a pendant group with a pKa of from 4 to 7.

Polymersomes are synthetic vesicles formed from amphiphilic block copolymers. Over the last fifteen years they have attracted significant research attention as versatile carriers because of their colloidal stability, tuneable membrane properties and ability in encapsulating or integrating other molecules (for one representative review article, see J Control Release 2012 161(2) 473-83, the contents of which are herein incorporated by reference in their entirety).

The polymersome used in the present invention is typically a self-assembled structure. The polymersome typically comprises an amphiphilic block copolymer. An amphiphilic block copolymer comprises a hydrophilic block and a hydrophobic block. In the polymersomes of the present invention typically the hydrophilic block comprises the protein repellent polymer (a), which typically comprises a phosphorylcholine pendant group, and the hydrophobic block (b) which is a pH sensitive biodegradable succinate polymer comprising a pendant group with a pKa of from 4 to 7, for example a polypropylene ((((1H-imidazol-5-yl)acetamido)-3-oxopropyl)thio)succinate (PPITS) polymer or a derivative thereof.

Such polymersomes are able to mimic biological phospholipids. Molecular weights of these polymers are much higher than naturally-occurring phospholipid-based surfactants such that they can assemble into more entangled membranes (J. Am. Chem. Soc. 2005, 127, 8757, the contents of which are herein incorporated by reference in their entirety), providing a final structure with improved mechanical properties and colloidal stability. Furthermore, the flexible nature of the copolymer synthesis allows the application of different compositions and functionalities over a wide range of molecular weights and consequently of membrane thicknesses. Thus the use of these block copolymers as delivery vehicles offers significant advantages.

Polymersomes are often substantially spherical. Polymersomes typically comprise a bilayered membrane. The bilayer is generally formed from two layers of amphiphilic molecules, which align to form an enclosed core with hydrophilic head groups facing the core and the exterior of the vesicle, and hydrophilic tail groups forming the interior of the membrane.

A typical (largest) diameter of a polymersome is in the range 50 to 5000 nm. More typically, the diameter is in the range 50 to 1000 nm. Polymersomes having a diameter in this range are normally termed "nanopolymersomes" or "nanovesicles". The nanopolymersomes are preferably substantially spherical in shape. Typically, the nanopolymersomes have a number average diameter of less than 300 nm, preferably less than 250 nm, most preferably less than 200 nm or 150 nm. The thickness of the bilayer is generally between 2 to 50 nm, more typically between 5 and 20 nm. These dimensions can routinely be measured, for example by using Transmission Electron Microscopy (TEM) and/or and Small Angle X-ray Scattering (SAXS) (see, for example, J. Am. Chem. Soc. 127 8757 2005, the contents of which are herein incorporated by reference in their entirety).

In aqueous solution, normally an equilibrium exists between different types of structures, for instance between polymersomes and micelles. It is preferred that at least 80%, more preferably at least 90% or 95% by weight and most preferably all of the structures in solution are present as polymersomes. This can be achieved using the methods outlined herein.

The polymersome typically releases, for example, fumarate and propyl glycol, thiosuccinate derivatives with or without tert-butyl group and imidazole in vivo after administration to a subject. Typically the polymersome dissociates and the fumarate, propyl glycol, thiosuccinate derivatives with or without tert-butyl group and imidazole are released as a result of in situ hydrolysis and/or enzymatic degradation (e.g., by lipases or esterases) of the polymer (b). When the fumarate backbone of the starting material is not fully saturated during functionalisation (attaching the pendant group), then on dissociation the polymersome releases fumarate.

In a preferred embodiment, polymer (b) is or comprises polypropylene ((((1H-imidazol-5-yl)acetamido)-3-oxopropyl)thio)succinate or a derivative thereof. More preferably, polymer (b) is or comprises poly[propylene 2-((2-(2-(1H-imidazol-5-yl)acetamido)-3-(tert-butoxy)-3-oxopropyl)thio)succinate].

The poly[propylene (1H-imidazol-5-yl)acetamido)-3-oxopropyl)thio)succinate polymer, or derivative thereof, for example poly[propylene 2-((2-(2-(1H-imidazol-5-yl)acetamido)-3-(tert-butoxy)-3-oxopropyl)thio)succinate], are examples of polymers whose hydrolysis may release fumarate, propyl glycol, thiosuccinate derivatives with or without tert-butyl group and imidazole. When the fumarate backbone of the starting material is not fully saturated during functionalisation (attaching the pendant group), then on dissociation and subsequent degradation the polymersome releases fumarate.

If the polymersome comprises a drug encapsulated within the polymersome then the polymersome is also capable of releasing the drug in vivo after administration to a subject. Again, typically the polymersome dissociates and drug is thereby released.

As explained already, component (a) of the polymersome is a protein repellent polymer, which allow extended circulation half life of the nanoparticle once injected. Component (b) is pH sensitive and typically releases, for example, fumarate and propyl glycol, thiosuccinate derivatives with or without tert-butyl group and imidazole by in situ hydrolysis and/or enzymatic degradation (e.g., by lipases or esterases). The encapsulated drug, if any, is therefore released after the polymersome has been internalised within a cell.

Dissociation of the polymersome may be promoted by a variety of mechanisms, but is often promoted by the hydrolysis of the hydrophobic block copolymer. Typically, ester bonds in the polymer backbone are hydrolysed releasing, for example, fumarate, propyl glycol (a metabolite, which is quickly (half life 2 hr) metabolized by the liver to form lactate, acetate, and pyruvate), thiosuccinate derivatives with or without tert-butyl group and imidazole by in situ hydrolysis and/or enzymatic degradation (e.g., by lipases or esterases). This process is catalysed by enzymes known as esterases and by acidic pH. Both conditions are typical of endo-lysosome compartments where the polymersomes traffic to upon endocytosis.

Typically, the polymer (b) comprises an imidazole group (typically as a pendant group), which typically has a pKa in the range 6.4 to 7. The process of endocytosis includes a reduction in the local pH experienced by the polymersome from around pH 7.4 to around pH 5-6. This pH drop is typically sufficient to trigger disintegration of the polymersome.

pKa means the pH where half of the pendant groups are ionised. pKa can be determined by a variety of methods including pH titration followed by potentiometric titration, UV spectroscopy and Dynamic Light Scattering (DLS). An appropriate method should be selected to measure the pKa according to the copolymer which is being analysed and its solubility in the test media.

DLS is a particularly preferred method for measuring pKa. As indicated in J. Am. Chem. Soc 2005 127 17982-17983, the contents of which are herein incorporated by reference in their entirety, the DLS signal from a copolymer, such as PMPC25-b-PDPA20 copolymer, in water varies with pH. At a certain pH the signal rapidly increases as the copolymer undergoes a transition from being molecularly deassociated to associated. The pKa is taken as the pH of the mid-point of this rapid increase. These experiments are described further in Biomacromolecules 2006, 7, 817-828, the contents of which are herein incorporated by reference in their entirety. In this reference, the experiments are performed on micelles of block copolymer, but the techniques may also be applied when the phase transition involves polymersome formation.

The pKa of a group in a polymer is determined on the basis of a polymer system (and not assumed to be the same as the pKas of similar moieties in non-polymeric systems).

Typically, the pendant group of the polymer (b) of the polymersome comprises a cationisable moiety. Cationisable moieties are, for instance, primary, secondary or tertiary amines or imidazole groups, capable of being protonated at pHs below a value in the range 3 to 6.9. Alternatively the group may be a phosphine. These cationisable moieties can be inherently present within the monomer units or alternatively be conjugated post-polymerisation by exploiting suitable conjugation strategies (e.g., thiol-ene addition to the double bond of the fumarate backbone). Preferably, the cationisable moiety is an imidazole.

Preferably, the pKa of the pendant groups is in the range 4.0 to 6.9, more preferably 5.5 to 6.9. The polymersomes are correspondingly capable of disassociating in such pH ranges.

The imidazole group on the PPITS polymer, or derivative thereof, exhibits a pKa within the desired range of pH for escaping lysosomal degradation. The pKa value, though, can also be further tailored by modifying the position as well as nature of the different substituents around the imidazole ring. This pH-sensitivity has been introduced by exploiting the double bond present in poly(propyl fumarate) (PPF) either as it comes or after isomerisation of poly(propyl maleate) (PPM), as well as on pristine PPM by conjugating tert-butyl cysteinate via thiol-ene addition. This is just one example of the possible conjugation chemistries (e.g. Diels-Alder, aldol reaction) as well as conjugation motifs (e.g., aminoacids, DNA, oligopeptides, whole proteins, drugs, etc. . . . ) involving the double bond within the polymer structure. The double bonds within the polymer structure may be fully or partially functionalised. When the double bonds within the polymer structure are partially functionalised a polymer comprising both saturated (for example, succinate) and unsaturated (for example fumarate) monomer units in the backbone is formed. The cysteine N-terminus can be conjugated to imidazole or methylimidazole bearing acids including the 1H-imidazole-1-acetic acid (pKa 6.8), 4-imidazolacetic acid, (pKa 6.6), Di-Methylimidazoleacetic acid (pKa 6.4) and Methylimidazoleacetic acid (pKa 6.2). This conjugation reaction can be performed before or after the thiol-ene addition, via NHS chemistry or other type of conjugation reactions which are well known amongst those skilled in the art. Similarly, the same cysteine derivative protected on the amino group (with a tert-butoxy carbonyl moiety) and with the free carboxylic group can also be conjugated to the same imidazole moieties but deriving from a histamine derivative. In all cases, all these structures are metabolites part of histidine metabolism and/or histamine catabolism and they will allow tuning the final polymer pKa from 6.2 to 6.8. Furthermore, the number of functionalities can be tuned by adding to the polymerisation mixture a saturated monomer, such as succinic acid (in case of polycondensation) or succinic anhydride (in case of ring-opening copolymerisation, or ROCOP), thus creating sequences of saturated and unsaturated polyesters.

Preferably, the polymer (b) (the hydrophobic block of the polymersome) has a degree of polymerisation of at least 5, more preferably at least 10. Preferably, the degree of polymerisation is no more than 250, even more preferably, no more than 200. It is preferred that the ratio of the degree of polymerisation of the protein repellent polymer (a) (the hydrophilic block) to the polymer (b) (the hydrophobic block) is in the range 1:2.5 to 1:8. All of these limitations promote polymersome, rather than micelle formation.

The protein repellent polymer (a) may be based on condensation polymers, such as polyesters, polyamides, polyanhydrides, polyurethanes, polyethers (including polyalkylene glycols, especially PEG), polyimines, polypeptides, polyureas, polyacetals and polysaccharides, but preferably is based on a controlled radical polymerisation of ethylenically unsaturated monomers. The protein repellent polymer preferably comprises phosphorylcholine as pendant groups, in which case the pendant groups may be present in the monomers and remain unchanged in the polymerisation process. It is alternatively possible to derivatise the pendant group of a monomer to transform it into a phosphorylcholine group after polymerisation.

In one currently preferred embodiment, the protein repellent polymer (a) is formed from ethylenically unsaturated monomers. Non-limiting suitable ethylenically unsaturated monomers have the general formula (IV)

$$YBX \quad (IV),$$

in which:

Y is an ethylenically unsaturated group selected from 
$H_2C{=}CR{-}CO{-}A{-}$, $H_2C{=}CR{-}C_6H_4{-}A^1{-}$, $H_2C{=}CR{-}CH_2{-}A^2{-}$, $R^2O{-}CO{-}CR{=}CR{-}CO{-}O{-}$, $RCH{=}CH{-}CO{-}O{-}$, $RCH{=}C(COOR^2)CH_2{-}CO{-}O{-}$, and A is $-O-$ or $NR^1$;
$A^1$ is selected from a bond, $(CH_2)_LA^2$ and $(CH_2)_LSO_3^-$ in which L is 1 to 12;
$A^2$ is selected from a bond, $-O-$, $-O-CO-$, $-CO-O$, $-CO-NR^1-$, $-NR^1-CO-$, $-O-CO-NR^1-$ and $-NR^1-CO-O-$;
R is hydrogen or $C_{1-4}$ alkyl;
$R^1$ is hydrogen, $C_{1-4}$ alkyl or BX;
$R^2$ is hydrogen or $C_{1-4}$ alkyl;
B is a bond, or a straight or branched alkanediyl, alkylene oxaalkylene, or alkylene (oligooxalkylene) group, optionally containing one or more fluorine substituents; and
X is a phosphorylcholine group, i.e. a group having the formula In the monomer of the general formula (IV) it is preferred that the ethylenic unsaturated group Y is $H_2C{=}CR{-}CO{-}A{-}$. Such acrylic moieties are preferably methacrylic, that is in which R is methyl, or acrylic, in which R is hydrogen. Whilst the compounds may be (meth)acrylamido compounds (in which A is $NR^1$), in which case $R^1$ is preferably hydrogen, or less preferably, methyl, most preferably the compounds are esters, that is in which A is O.

In monomers of the general formula (IV), especially where Y is the preferred (alk)acrylic group, B is most preferably an alkanediyl group. Whilst some of the hydrogen atoms of such group may be substituted by fluorine atoms, preferably B is an unsubstituted alkanediyl group, most preferably a straight chain group having 2 to 6 carbon atoms.

A particularly preferred monomer of general formula (IV) is 2-methacryloyloxyethyl-phosphorylcholine (MPC). Mixtures of monomers each having the above general formula may be used, as can mixtures with other monomers, e.g. with other hydrophilic monomers.

Preferably, the protein repellent polymer (a) is an acrylate polymer. An acrylate polymer is a polymer formed from one or more acrylate monomers. An acrylate monomer is a monomer comprising an acrylate group (i.e. $CH_2{=}CH{-}COO{-}$) which may be substituted or unsubstituted and as such includes methacrylate monomers and other such monomers covered by formula (IV). Preferably, the protein repellent polymer (a) is polymer that comprises pendant phosphorylcholine groups. Particularly preferably the protein repellent polymer (a) is acrylate polymer that comprises pendant phosphorylcholine groups. For example, the protein repellent polymer (a) may comprise units of formula (I)

in which $R^p$ is hydrogen or methyl and $A^p$ is a group of formula (I')

in which $X^p$ is a $C_{1-6}$ alkylene group. In some cases, $X^p$ may be one or more amino acids, for instance a peptide, dipeptide or oligopeptide.

Preferably $X^p$ is a $C_{2-6}$ alkylene group. Preferably $R^p$ is methyl. In a particularly preferred embodiment the phosphorylcholine polymer is poly(2-methacryloyloxy)ethyl phosphorylcholine.

Alternatively, the protein repellent polymer (a) may be a polypeptide, for instance those described in Yakovlev and Deming, *J. Am. Chem. Soc.*, 2015, 137 (12), pp 4078-4081 the entirety of which is incorporated by reference. For instance, the protein repellent polymer (a) may comprise poly(L-phosphorylcholine serine) or poly(L-phosphorylcholine homoserine).

Alternatively, the protein repellent polymer (a) may be coupled with polymers produced by epoxides, anhydrides, lactide and/or CO2, to produce polyesters and polycarbonates. For instance those described in Shyeni and Williams, *Chem. Commun.*, 2015, 51, 6459 the entirety of which is incorporated by reference.

Typically, the pendant group on the pH sensitive biodegradable succinate polymer (b) has a pKa of from 5.5 to 7, preferably from 6.2 to 7.

Typically, the pH sensitive biodegradable succinate polymer (b) comprises succinate monomeric units in the polymer backbone. The pH sensitive biodegradeable polymer (b) may comprise a mixture of succinate and fumarate monomeric units in the polymer backbone. As those skilled in the art would readily appreciate, such biodegradeable polymers (b) may, for example, be obtained when starting from a polymer comprising fumarate monomeric units in the polymer backbone and when functionalisation to add pendant groups to these monomeric units (in each individual case resulting in conversion of a fumarate monomeric unit to a succinate monomeric unit having a pendant group) is partial, but not complete (i.e. not all of the fumarate monomeric units in the reagent polymer are converted to succinate monomeric unit having a pendant group). For the avoidance of doubt, "a pH sensitive biodegradable succinate polymer comprising a pendant group with a pKa of from 4 to 7" as defined herein includes: (i) a polymer that consists of succinate monomeric units comprising a pendant group; and (ii) a polymer that comprises both succinate monomeric units comprising a pendant group and fumarate monomeric units.

Preferably, pH sensitive biodegradable succinate polymer (b) further comprises a propylene monomer in the polymer backbone.

Typically, the pendant group on the pH sensitive biodegradable succinate polymer (b) comprises an imidazole moiety.

The imidazole moiety may be imidazole, or a substituted imidazole, for instance an alkyl substituted imidazole. The imidazole may be singly or multiply substituted. Preferably, the alkyl substituent is methyl or ethyl.

Typically, the imidazole moiety is imidazole, methylimidazole or dimethylimidazole.

Preferred pH sensitive biodegradable fumarate polymers (b) include those comprising poly[propylene (1H-imidazol-5-yl)acetamido)-3-oxopropyl)thio)succinate or derivatives thereof. Most preferably, polymer (b) is or comprises poly [propylene 2-((2-(2-(1H-imidazol-5-yl)acetamido)-3-(tert-butoxy)-3-oxopropyl)thio) succinate].

During degradation, e.g. hydrolysis, of the polymer (b) molecules such as fumarate and propyl glycol (a metabolite, which is quickly (half life 2 hr) metabolized by the liver to form lactate, acetate, and pyruvate), thiosuccinate derivatives with or without tert-butyl group and imidazole may be released by in situ hydrolysis and/or enzymatic degradation (e.g., by lipases or esterases) of the polymersome.

A preferred polymer (b) comprises succinate and a propylene monomer. An advantage of this polymer is that the secondary product of its hydrolysis is propylene glycol which is generally recognised as safe material and already approved for several clinical applications. Propylene glycol is metabolized by the liver to form lactate, acetate, and pyruvate. The non-metabolised drug is excreted in the urine mainly as the glucuronide conjugate, approximately 12 to 45 percent is excreted unchanged in urine.

More generally, either or both the polymers (a) and (b) may include comonomers, for instance to provide functionality, control over hydrophobicity, control over pH sensitivity, pKa or pKb as the case may be, control over temperature sensitivity or as general diluents. For instance comonomers providing functionality may be useful to provide conjugation of pendant groups following polymerisation and/or polymersome formation, to provide targeting moieties, or to provide for conjugation between the biologically active molecule and the polymer. Alternatively, functional groups may allow for crosslinking of the polymer following polymersome formation, to confer increased stability on the polymersome structure. Examples of suitable comonomers are compounds of the general formula (VI)

(VI)

in which
$R^{18}$ is selected from hydrogen, halogen, $C_{1-4}$ alkyl and groups $COOR^{22}$ in which $R^{22}$ is hydrogen or $C_{1-4}$ alkyl;
$R^{19}$ is selected from hydrogen, halogen and $C_{1-4}$ alkyl;
$R^{20}$ is selected from hydrogen, halogen, $C_1$-4 alkyl and groups $COOR^{22}$ provided that $R^{18}$ and $R^{20}$ are not both $COOR^{22}$; and
$R^{21}$ is a $C_{1-10}$ alkyl, a $C_{1-20}$ alkoxycarbonyl, a mono- or di-($C_{1-10}$ alkyl)amino carbonyl, a $C_{6-20}$ aryl (including alkaryl) a $C_{7-20}$ aralkyl, a $C_{6-20}$ aryloxycarbonyl, a $C_{1-20}$-aralkyloxycarbonyl, a $C_{6-20}$ acylamino carbonyl, a $C_{7-20}$ aralkyl-amino, a hydroxyl or a $C_{2-10}$ acyloxy group, any of which may have one or more substituents selected from halogen atoms, alkoxy, oligo-alkoxy, aryloxy, acyloxy, acylamino, amine (including mono and di-alkyl amino and thalkylammonium in which the alkyl groups may be substituted), carboxyl, sulphonyl, phosphoryl, phosphino, (including mono- and di-alkyl phosphine and tri-alkylphosphonium), zwitterionic, hydroxyl groups, vinyloxycarbonyl and other vinylic or allylic substituents, and reactive silyl or silyloxy groups, such as trialkoxysilyl groups; or $R^{21}$ and $R^{20}$ or $R^{21}$ and $R^{19}$ may together form —$CONR^{23}CO$ in which $R^{23}$ is a $C_{1-20}$ alkyl group.

It is preferred for at least two of the groups $R^{18}$, $R^{19}$, $R^{20}$ and $R^{21}$ to be halogen or, more preferably, hydrogen atoms. Preferably $R^{18}$ and $R^{19}$ are both hydrogen atoms. It is particularly preferred that compound of general formula X is a styrene or acrylic compound. In styrene compounds $R^{21}$ represents an aryl group, especially a substituted aryl group in which the substituent is an amino alkyl group, a carboxylate or a sulphonate group. Where the comonomer is an acrylic type compound, $R^{21}$ is an alkoxycarbonyl, an alkyl amino carbonyl, or an aryloxy carbonyl group. Most preferably in such compounds $R^{21}$ is a $C_{1-20}$-alkoxy carbonyl group, optionally having a hydroxy substituent. Acrylic compounds are generally methacrylic in which case $R^{20}$ is methyl.

Preferably the comonomer is a non-ionic comonomer, such as a $C_{1-24}$ alkyl(alk)-acrylate or -acrylamide, mono- or di-hydroxy-$C_{1-6}$-alkyl(alk)-acrylate, or acrylamide, oligo ($C_{2-3}$ alkoxy) $C_{2-18}$-alkyl (alk)-acrylate, or -acrylamide, styrene, vinylacetate or N-vinyllactam.

For optimum nanovesicle formation, the block copolymers should have controlled molecular weights. It is preferable for each of the blocks to have molecular weight controlled within a narrow band, that is, to have a narrow polydispersity. The polydispersity of molecular weight should, for instance, be preferably less than 2.0, more preferably less than 1.5, for instance in the range 1.1 to 1.4.

In one preferred embodiment of this invention, the polymersome comprises poly(2-methacryloyloxy)ethyl phosphorylcholine and polypropylene ((((1H-imidazol-5-yl)acetamido)-3-oxopropyl)thio)succinate (PPITS), or a derivative thereof. In this preferred embodiment, the polymersome typically comprises a block copolymer in which one block comprises poly(2-methacryloyloxy)ethyl phosphorylcholine and another block comprises polypropylene ((((1H-imidazol-5-yl)acetamido)-3-oxopropyl)thio)succinate (PPITS), or a derivative thereof. In an exemplary embodiment the polymersome comprises a block copolymer comprising a poly(2-methacryloyloxy)ethyl phosphorylcholine block and a polypropylene ((((1H-imidazol-5-yl)acetamido)-3-oxopropyl)thio)succinate (PPITS), or a derivative thereof, block.

In one particularly preferred embodiment of this invention, the polymersome comprises poly(2-methacryloyloxy)ethyl phosphorylcholine and poly[propylene 2-((2-(2-(1H-imidazol-5-yl)acetamido)-3-(tert-butoxy)-3-oxopropyl)thio)succinate]. In this particularly preferred embodiment, the polymersome typically comprises a block copolymer in which one block comprises poly(2-methacryloyloxy)ethyl phosphorylcholine and another block comprises poly[propylene 2-((2-(2-(1H-imidazol-5-yl)acetamido)-3-(tert-butoxy)-3-oxopropyl)thio)succinate]. In an exemplary embodiment the polymersome comprises a block copolymer comprising a poly(2-methacryloyloxy)ethyl phosphorylcholine block and a poly[propylene 2-((2-(2-(1H-imidazol-5-yl)acetamido)-3-(tert-butoxy)-3-oxopropyl)thio)succinate] block.

The block copolymer may be a simple A-B block copolymer, or may be an A-B-A or B-A-B block linear triblock copolymer or a $(A)_2B$ or $A(B)_2$ star copolymer (where A is the phosphorylcholine polymer containing block and B is the fumarate polymer containing block). It may also be an A-B-C, A-C-B or B-A-C linear triblock copolymers or an ABC star copolymer, where C is a different type of block. C blocks may, for instance, comprise functional, e.g. cross-linking or ionic groups, to allow for reactions of the copolymer, for instance in the novel compositions. Crosslinking reactions especially of A-C-B type copolymers, may confer useful stability on polymersomes. Cross-linking may be covalent, or sometimes, electrostatic in nature. Cross-linking may involve addition of a separate reagent to link functional groups, such as using a difunctional alkylating agent to link two amino groups. The block copolymer may alternatively be a star type molecule with hydrophilic or hydrophobic core, or may be a comb polymer having a hydrophilic backbone (block) and hydrophobic pendant blocks or vice versa. Such polymers may be formed for instance by the random copolymerisation of monounsaturated macromers and monomers.

Further details of a suitable process for polymerising the monomers are to be found in WO 03/074090, the contents of which are herein incorporated by reference in their entirety.

The methods to be used for polymerising the monomers are living radical polymerisation process, functional NCA (N-carboxyanhydride) polymerisation, polycondensation and ring opening polymerisation (ROP) and copolymerisation (ROCOP). In all cases efficient postpolymerisation modifications can be carried out via the exploitation of appropriate monomers bearing apt motifs, suitably protected in case of poor compatibility with the polymerisation process, well known to those skilled in the art. Living radical polymerisation has been found to provide polymers of monomers having a polydispersity (of molecular weight) of less than 1.5, as judged by gel permeation chromatography. Polydispersities in the range 1.2 to 1.4 for the or each block are preferred. The polymersomes may be loaded using a pH change system, electroporation or film hydration. In a pH change system process, polymer is dispersed in aqueous liquid in ionised form, in which it solubilises at relatively high concentrations without forming polymersomes. Subsequently the pH is changed such that some or all of the ionised groups become deprotonated so that they are in non-ionic form. At the second pH, the hydrophobicity of the block increases and polymersomes are formed spontaneously.

A method of forming polymersomes with a drug encapsulated in the core may involve the following steps: (i) dispersing the amphiphilic copolymer in an organic medium; (ii) phosphate buffer was added via a syringe pump to the composition formed in step (i); (iii) adding the drug to the water phase if hydrophilic or in the organic phase if hydrophobic; and (iv) at the end of the addition, an excess of PBS was added to the preparation and the residual organic solvents were removed via dialysis against sterile phosphate buffer using a dialysis tube.

This method preferably comprises a preliminary step wherein the amphiphilic copolymer is dispersed in an organic solvent in a reaction vessel and the phosphate buffer is then added with syringe pump to form polymersomes.

Step (ii), change the solvent and increase the pH to a value above the pKa of the poly[propylene (1H-imidazol-5-yl) acetamido)-3-oxopropyl)thio)succinate (PPITS) group.

Another method of forming polymersomes with a drug encapsulated in the core may involve the following steps: (i) dispersing the amphiphilic copolymer, and when needed the hydrophobic and/or amphiphilic drug, in an organic solvent in a reaction vessel; (ii) evaporating the solvent to form a film on the inside of the reaction vessel; and (iii) re-hydrating the film with an aqueous solution, optionally comprising a solubilised hydrophilic drug.

In more detail, polymersomes are typically prepared by dissolving copolymer in an organic solvent, such as a 2:1 chloroform:methanol mix in a glass container. If a hydrophobic or amphiphilic drug is to be encapsulated, it can be added with the copolymer. Solvent can be evaporated under vacuum leaving a copolymeric film deposited on the walls of the container. The film is then re-hydrated with an aqueous solution, for instance using phosphate buffer saline. If a hydrophilic drug is to be encapsulated, it can be included in the aqueous solution. The pH of the resultant suspension is decreased to a pH of around 2, to solubilise the film, and then increased slowly to a pH of around 6. The polymer hydration at neutral pH allows the encapsulation of the drug. The dispersion may then be sonicated and extruded, for instance using a bench top extruder. UV spectroscopy and HPLC chromatography may be used to calculate the encapsulation efficiency, using techniques well known in the art. An alternative method for forming polymersomes with an encapsulated drug may involve simple electroporation of the drug and polymer vesicles in water. For instance the drug may be contacted in solid form with an aqueous dispersion of polymer vesicles and an electric field applied to allow the formation of pores on the polymersomes membrane. The solubilised drug molecules may then enter the polymersome vesicles though the pores. This is followed by membrane self healing process with the consecutive entrapment of the active molecules inside the polymersomes.

Alternatively, drug dissolved in organic solvent may be emulsified into an aqueous dispersion of polymer vesicles, whereby solvent and drug become incorporated into the core of the vesicles, followed by evaporation of solvent from the system.

The polymersomes used in the invention may be formed from two or more different block copolymers. In this embodiment, in the method of forming polymersomes, a mixture of the two or more block copolymers is used.

For example, 0.01% to 10% (w/w) of drug is mixed with copolymer in the methods described above.

Encapsulated Drug

The polymersome of the invention may comprise a drug encapsulated within the polymersome.

It will be understood that the polymersome of the invention is capable of degrading into resorbable materials, for example fumarate, thiosuccinate derivatives with or without tert-butyl group and imidazole by in situ hydrolysis and/or enzymatic degradation (e.g., by lipases or esterases) in vivo. The polymersome can also provide drug encapsulation. For the avoidance of doubt it is also possible to encapsulate a plurality of different drugs within a single polymersome, or to provide a plurality of polymersomes each containing a particular encapsulated drug.

Non-limiting examples of specific drugs that may be encapsulated include carnosine, asiatic acid, flavonoids (e.g. xanthohumol, naringenin, galangin, fisetin and baicalin), cannabinoids (e.g., WIN55,212-2, JWH-133 and TAK-937), citicoline, minocycline, cerebrolysin, ginsenosoid-Rd, granulocyte-colony stimulating factor, Tat-NR2B9c, magnesium, albumin, paracetamol, aspirin, choline and magnesium salicylates, celecoxib, diclofenac (e.g. diclofenac potassium, diclofenac sodium), diflunisal, etodolac, fenoprofen, flurbiprofen, ibuprofen, indomethacin, ketoprofen, meclofenamate, mefenamic acid, meloxicam, nabumetone, naproxen (including naproxen sodium), oxaprozin, piroxicam, rofecoxib, salsalate, sodium salicylate, sulindac, tolmetin, valdecoxib, corticosteroids, alemtuzumab, interferon beta-1b, fingolimod, glatiramer acetate, natalizumab, plegridy, peginterferon beta 1a, teriflunomide, methotrexate, sulfasalazine, leflunomide, adalimumab, etanercept, golimumab, ustekinumab, azathioprine, cyclosporine, infliximab, golimumab, certolizumab, hydroxychloroquine, methotrexate, azathioprine, mycophenolate, acitretin, hydrea, isotretinoin, mycophenolate mofetil, sulfasalazine, 6-thioguanine, calcipotriol, calcitriol, tacalcitol, tacrolimus, pimecrolimus, dithranol, endamustine, bendamustine, carmustine, chlorambucil, cyclophosphamide, dacarbazine, ifosfamide, melphalan, procarbazine, streptozocin, temozolomide, capecitabine, 5-Fluoro Uracil, Fludarabine, Gemcitabin, Methotrexate, Pemetrexed, Raltitrexed, Actinomycin D, Bleomycin, Doxorubicin, Epirubicin, Mitomycin, Mitoxantrone, Etoposide, Docetaxel, Irinotecan, Paclitaxel, Topotecan, Vinblastine, Vincristine, Vinorelbine, Eribulin, Carboplatin, Cisplatin, Oxaliplatin, Afatinib, Aflibercept, BCG, Bevacizumab, Brentuximab, Cetuximab, Crizotinib, Denosumab, Erlotinib, Gefitinib, Imatinib, Interferon, Ipilimumab, Lapatinib, Panitumumab, Pertuzumab, Rituximab, Sunitinib, Sorafenib, Trastuzumab emtansine, Temsirolimus, Trastuzumab, Vemurafenib, Clodronate, Ibandronic acid, Pamidronate, Zolendronic acid, Anastrozole, Abiraterone, Bexarotene, Bicalutamide, Buserelin, Cyproterone, Degarelix, Exemestane, Flutamide, Folinic acid, Fulvestrant, Goserelin, Lanreotide, Lenalidomide, Letrozole, Leuprorelin, Medroxyprogesterone, Megestrol, Mesna, Octreotide, Stilboestrol, Tamoxifen and Thalidomide. For the avoidance of doubt, the encapsulated drug may also be fumarate or a fumarate ester, to supplement the effect of the fumarate produced by in vivo degradation of the polymersome.

Pharmaceutical Composition

The polymersome of the present invention can be formulated as a pharmaceutical composition using routine techniques known in the art. For example, pharmaceutical compositions already utilised for the formulation of polymersomes or drug-containing liposomes.

The pharmaceutical composition comprises a plurality of the polymersomes of the present invention. It also comprises one or more pharmaceutically acceptable excipients or diluents. The one or more pharmaceutically acceptable excipients or diluents may be any suitable excipients or diluents. The pharmaceutical composition is typically aqueous, i.e. it contains water (in particular sterile water).

A typical pH of the aqueous pharmaceutical composition is 7.0 to 7.6, preferably 7.2 to 7.4. Pharmaceutically acceptable buffers may be used to achieve the required pH. The pharmaceutical composition may be in the form of a sterile, aqueous, isotonic saline solutions. Typically the pharmaceutical composition is an injectable composition, e.g. it is suitable for intravenous delivery, for example it is suitable for infusion.

EXAMPLES

Synthetic vesicles were made using amphiphilic copolymers made by poly[propylene 2-((2-(2-(1H-imidazol-5-yl) acetamido)-3-(tert-butoxy)-3-oxopropyl)thio) succinate] (a PPITS derivative; hereinafter referred to simply as "PPITS") as a hydrophobic block and poly(2-(methacryloyloxy)ethyl phosphorylcholine) (PMPC) as a hydrophilic block.

A new synthetic route was developed for the production of a diblock PMPC-PPITS copolymer and its assembly into vesicles was studied. It was shown that PMPC-PPITS copolymer degrades into fumarate (as a result of incomplete functionalisation of the polyfumarate starting material) and propyl glycol (a metabolite, which is quickly (half life 2 hr) metabolized by the liver to form lactate, acetate, and pyruvate), thiosuccinate derivatives with or without tert-butyl group and imidazole by in situ hydrolysis and/or enzymatic degradation (e.g., by lipases or esterases). It was thus proven that PMPC-PPITS forms polymersomes that degrade into resorbable materials.

Production of Polymersomes

Synthesis of PMPC-PPF

Example of Ring-Opening Copolymerisation Procedure (Synthesis of PPM)

In a controlled dry atmosphere, 0.020 mmol SalenCrCl (or other suitable catalyst; e.g., diphenyl zinc) and 4.0 mmol maleic anhydride were placed in a vial equipped with a stir bar. The appropriate solvent (toluene, 0.50 mL) was added, followed by 4.0 mmol propylene oxide (epoxide). The sealed vial was placed in an aluminium heat block preheated to the desired temperature (45° C.). $^1$H-NMR spectrum analysis was used to determine the monomer conversion after the reaction became viscous. The viscous reaction mixture was then dissolved in a minimum amount of dichloromethane and precipitated into an excess of hexanes. This process was repeated (diethyl ether was used as the non-solvent in the case of PPM) until all residual monomer was removed. After polymer washes, the material was redissolved in THF and passed onto an ion-exchange column to remove the metal catalyst. After this further purification step, the material was collected and vacuum dried.

Example Isomerisation Procedure (of PPM into PPF)

For a one-pot procedure, 0.1 equivalent of diethyl amine was added directly to the polymer mixture at the end of the polymerization and the polymer was dissolved in CDCl$_3$. For a two-step procedure, an isolated polymer sample was dissolved in CDCl$_3$ and 0.1 equivalent of diethyl amine was added. For both procedures, the solution was allowed to stir and isomerization progress was checked by $^1$H-NMR spec- troscopy. Upon completion of reaction, all volatiles were removed under vacuum. The polymer was subsequently redissolved in $CH_2Cl_2$ and precipitated into hexanes. The polymers were then vacuum dried and isomerization completion was confirmed by 1H NMR spectroscopy.

Example of Polycondensation (Direct Synthesis of PPF)

Poly (propylene) fumarate was synthesised by the transesterification polycondensation of diethyl fumarate and propylene glycol, using $ZnCl_2$ as catalyst and hydroquinone as radical inhibitor. In a typical two step polymerisation, 14.98 mL of diethyl fumarate and 20 mL of propylene glycol were added in a two-necks round bottom flask and the reagents were stirred under a nitrogen flow for 30 min. Then, 200 mg of $ZnCl_2$ and 124 mg of hydroquinone were added to the reaction mixture and the reagents were heated to 150° C. under nitrogen flow overnight. Then, the nitrogen flow was stopped and vacuum was applied whilst stirring at 170° C. for 6 h. The product was purified by exhaustive dialysis (cut-off 3.5 KDa) against $CHCl_3$, $CHCl_3$/MeOH and then MeOH (at least three changes in each solvent).

Example of Synthesis of PPF ATRP Macroinitiator

A solution of PPF (1 eq.) and triethylamine (3 eq.) in anhydrous THF was slightly cooled in an ice-water bath. Then, 2-bromoisobutyryl bromide (4 eq.) in the minimum amount of anhydrous THF was added dropwise to the reaction mixture. The solution was warmed to room temperature and stirred for 48 h. The mixture was poured into water and extensively dialysed with a 1000 kDa MWCO membrane against water and then freeze-dried.

Example of Synthesis of PMPC-PPF Via ATRP (Atom-Transfer Radical Polymerisation)

PPF macroinitiator (1 eq.) and MPC monomer (5 eq.) were weighed off in a round-bottom flask and dissolved in toluene/isopropanol 2:1 (v/v). Then, 2 equivalents of N,N,N',N'-pentamethyldiethylenetriamine were added and the reaction mixture was purged with $N_2$ under stirring for 1 hour. Then 2 equivalents of Cu(I)Br were weighed and added under $N_2$ flow and the reaction was sealed under nitrogen atmosphere and kept under stirring for 48 h at 35° C. After 48 h the reaction was diluted with $CHCl_3$/MeOH 2:1 (v/v) and filtered on silica to remove the oxidised catalyst. The product was concentrated by rotary evaporation and further purified by exhaustive dialysis (cutoff 3.5 KDa) against $CHCl_3$/MeOH 2:1 v/v mixture (2 changes), MeOH (3 changes), and then against Milli-Q water (at least 4 changes). The product was recovered by freeze-drying. The product was then isolated via freeze-drying and characterised via $^1$H-NMR.

Example of Synthesis of PMPC-PPITS Via ATRP

PPF-PMPC (1 eq.) was dissolved in 2 mL of $CHCl_3$/MeOH 2:1 (v/v), and tert-butyl (2-(1H-imidazol-5-yl)acetyl)-cysteinate (3 eq.) solubilised in 20 mL of MeOH were added. The reaction mixture was irradiated under stirring for 6 h with a UV lamp at λ=365 nm. The product was then purified by exhaustive dialysis (cutoff 3.5 KDa) against MeOH (3 changes), then against acidic Milli-Q water (pH=3, at least 2 changes), and finally neutral Milli-Q water (at least 4 changes). The product was recovered by freeze-drying. The product was then isolated via freeze-drying and characterised via $^1$H-NMR and GPC.

Polymersomes Preparation

Polymersomes are prepared by solvent switch, which is a technique known in the art. The preparation was performed in sterile conditions in biological safety cabinets (KS15-Thermo Fisher Scientific). The polymer stock solution (0.5 mL, 10 to 80 mg/mL in DMF/MeOH 2:1 v/v) was filtered onto sterile 0.22 um sterile filters prior to any manipulation. Then, PBS 0.1 M pH 7.4 (1.15 mL) was added via a syringe pump at a flow rate ranging from 1 to 100 uL/min under vigorous stirring, to form the polymersomes. At the end of the addition, an excess of PBS (1.85 mL) was added to the preparation and the residual organic solvents were removed via dialysis against sterile 0.1 M PBS pH 7.4 using a dialysis tube (MWCO=1000) at 25° C. over 48 h (4-6 changes/day). Thereafter, the obtained polymersome preparation was further purified via ultrasonication for 15 minutes at 0° C. and centrifugation at 1000 g for 20 min. The concentration of this solution was evaluated gravimetrically, whilst the size and shape of the polymersomes were characterised via DLS and TEM analysis.

Polymersomes were purified from aggregates and micelles via gel permeation chromatography (GPC) using sepharose 4B as a substrate. Dynamic light scattering (DLS) was used to assess the size distribution of polymersomes, via a Malvern Zetasizer Nano ZS laser light scatterer equipped with a He—Ne 4 mW 633 nm laser. Polymersomes were diluted in filtered PBS in 1 ml disposable cuvettes, and experiments were an average of n=3 runs at a set angle of 173°. Polymersomes in filtered PBS were also assessed for morphology using transmission electron microscopy (TEM). Samples were mounted on glow-discharged carbon coated grids by submerging the grids into the polymersome solution for 60 seconds, followed by staining for 5 seconds using 0.75% (w/w) phosphotungstic acid (PTA). Grids were then washed with PBS, dried under vacuum and assessed via a JEOL microscope using 100 kV voltage tension.

PMPC-PPITS Degradation Assay

Degradation studies are performed by incubating the polymersomes with suitable enzymatic cocktails (e.g., from porcine and/or human origin) which mimic the exposure to endosomal conditions, both qualitatively as well as in terms of enzyme concentrations. Characterisation of the degradation is assessed with field flow fractionation (FFF) as well as via dynamic light scattering (DLS), which allows the transition from vesicular to micellar structures to be followed. In addition, GPC and HPLC analysis are also performed to evaluate the molecular weight modifications resulting from the enzymatic digestion. HPLC-MS is also exploited to confirm the identity of the obtained metabolites after degradation.

The invention claimed is:

1. A polymersome that comprises:
   (a) a protein repellent polymer; and
   (b) a pH sensitive biodegradable succinate polymer comprising (i) succinate monomeric units in the polymer backbone, and (ii) a pendant group with a pKa of from 6.2 to 7, wherein the pendant group comprises an imidazole moiety.

2. The polymersome of claim 1, wherein the protein repellent polymer is an acrylate polymer, a polypeptide, a polyester, a polyamide, a polyanhydride, a polyurethane, a polyether, a polyimine, a polyurea, a polyacetal, a polysaccharide or a polycarbonate.

3. The polymersome of claim 2, wherein the protein repellent polymer comprises units of formula (I)

(I)

in which $R^p$ is hydrogen or methyl and $A^p$ is a group of formula (I')

(I')

in which $X^p$ is a $C_{1-6}$ alkylene group.

4. The polymersome of claim 1, wherein the protein repellent polymer is poly (2-(methacryloyloxy) ethyl phosphorylcholine) or poly (ethylene oxide).

5. The polymersome of claim 1, wherein the imidazole moiety is imidazole, methylimidazole or dimethylimidazole.

6. The polymersome of claim 1, wherein the pH sensitive biodegradable succinate polymer is poly[propylene 2-((2-(2-(1H-imidazol-5-yl) acetamido)-3-(tert-butoxy)-3-oxopropyl) thio) succinate].

7. The polymersome of claim 1, which further comprises a drug encapsulated within the polymersome.

8. A pharmaceutical composition comprising: a plurality of the polymersomes of claim 1; and one or more pharmaceutically acceptable excipients or diluents.

9. A method that comprises administering the polymersome of claim 1 to a subject.

10. A method that comprises: (i) administering the polymersome of claim 7 to a subject; and (ii) releasing the drug in vivo in the subject.

* * * * *